UNITED STATES PATENT OFFICE.

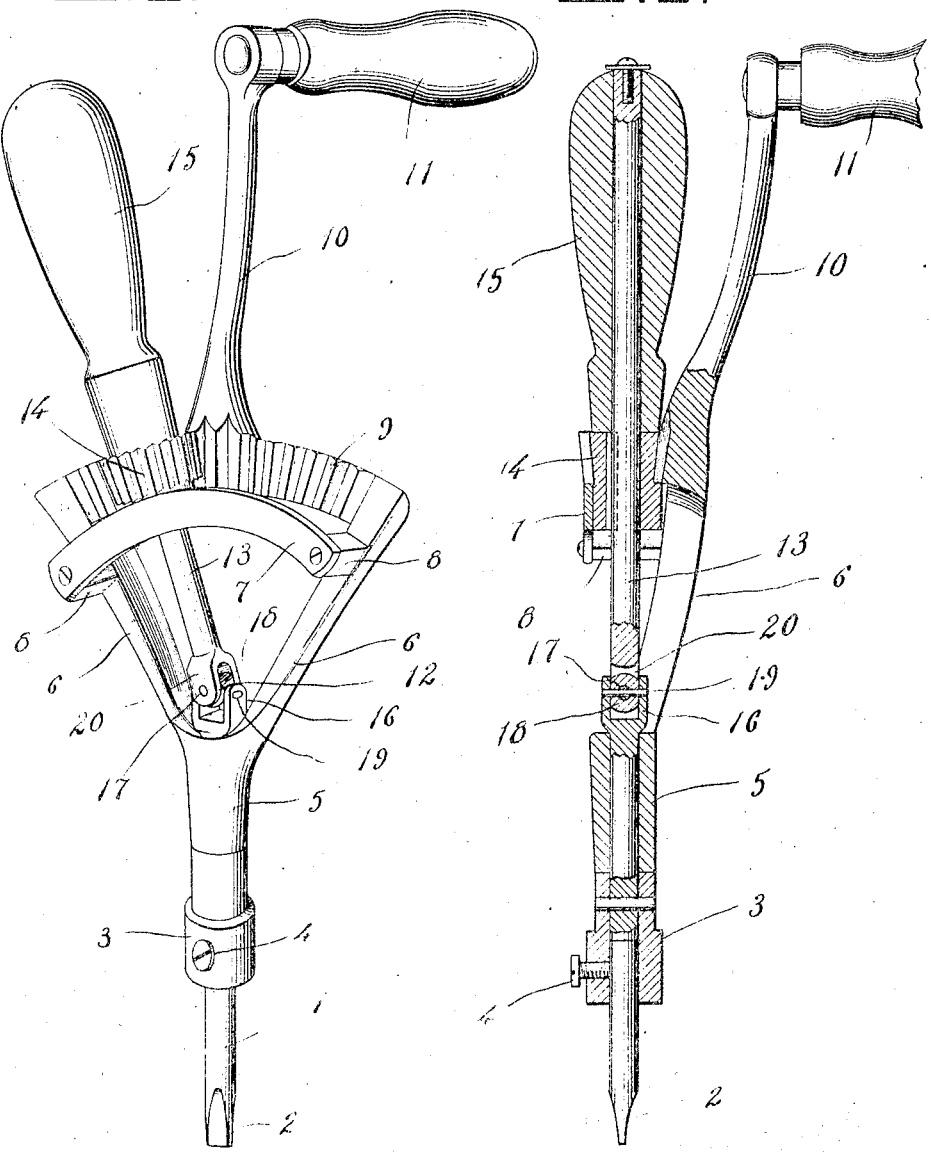

SAMUEL S. LIVEZEY, OF BOWLING GREEN, OHIO.

VALVE-GRINDER.

1,059,175.

Specification of Letters Patent.   Patented Apr. 15, 1913.

Application filed August 20, 1912. Serial No. 716,054.

*To all whom it may concern:*

Be it known that I, SAMUEL S. LIVEZEY, a citizen of the United States of America, residing at Bowling Green, in the county of Wood and State of Ohio, have invented new and useful Improvements in Valve-Grinders, of which the following is a specification.

This invention relates to improvements in valve grinders and has particular application to a device of the type set forth whereby valves may be ground while seated.

In carrying out the present invention, it is my purpose to provide a valve grinder whereby the valve may be oscillated on its seat so that the contacting walls of the valve and seat may be ground to relieve the same of gummy substances or other foreign matter and enable the valve to seat easily and effectively.

It is also my purpose to provide a valve grinder wherein the valve engaging member may be held properly applied to the valve and oscillated so as to impart a similar motion to the valve.

Furthermore, it is my intention to provide a valve grinder which will embrace the desired features of simplicity, efficiency, durability and convenience and which may be manufactured and marketed economically.

With the above and other objects in view, the invention consists in the construction, combination and arrangement of parts hereinafter set forth in and falling within the scope of the claims.

In the accompanying drawing; Figure 1 is a perspective view of a valve grinder constructed in accordance with the present invention, and Fig. 2 is a longitudinal central sectional view through the same, parts being shown in elevation.

Referring now to the accompanying drawing in detail, the numeral 1 designates a shank having one end thereof pointed as at 2 or otherwise formed to engage the head of the valve. This shank 1 may be of any convenient length and surrounding the same at an appropriate point in its length is a bearing collar 3 rigidly fastened to the shank by means of a set screw 4 or other like device. Loosely connected to the shank 1 is a frame which, in the present instance, comprises a tubular sleeve 5 surrounding the shank 1 above the bearing collar 3 and having one end in engagement with such collar, and a pair of arms 6, 6 connected to the free end of the sleeve and diverging outwardly thereof, a keeper or guide 7 being fastened at its opposite end to the arms 6, 6 adjacent to the upper extremities of the latter and spaced apart therefrom by means of blocks 8. Formed integral with the free ends of the arms 6, 6 or connected thereto in any suitable manner is a segmental rack 9 having fastened thereto, or formed integral therewith, as desired, and offset laterally therefrom a handle 10 terminating in a right angular grip 11, the grip being fastened to the free end of the handle in any suitable manner or by any approved means.

Connected to the free end of the shank 1 between the arms 6, 6 and preferably immediately above the sleeve 5 by means of a universal joint 12 is an actuating shaft 13 extending between the rack 9 and the guide or keeper 7 and equipped with a pinion 14 meshing with the rack and keyed to the shaft. Loosely encircling the free end of the actuating shaft beyond the pinion thereon is a grip 15.

In the present instance, the universal joint or connection between the adjacent ends of the shank and the actuating shaft is effected by means of a yoke 16 formed integral with the free end of the shank and carrying a pivot pin 17 having mounted thereon a block 18 pivotally connected by means of a pivot pin 19 with a yoke 20 formed on the proximate end of the actuating shaft, the pivot pins 17 and 19 being arranged at right angles to each other. It is to be understood, however, that I do not limit myself to any particular form of universal joint for connecting the respective ends of the actuating shaft and the shank even though I have described and delineated one particular type of such joint.

From the foregoing description taken in connection with the accompanying drawing, the construction, mode of operation and manner of employing my invention will be readily apparent. When it is desired to grind a valve against its seat, the pointed end of the shank 1 is engaged with the slot in the head of the valve and such point held in applied position by means of the grip 11 on the handle 10 and through the medium of the sleeve of the frame bearing on the bearing collar 3. The grip 15 is now grasped by the free hand of the operator and the actuating shaft moved back and forth thereby imparting a back and forth movement to the pinion which latter through the medium of the rack 9 rotates the actuating shaft and consequently the shank, the universal joint enabling the actuating shaft to be moved relatively to the rack and the frame without disturbing the position of the shank.

It will be noted that I have provided a valve grinder wherein puppet valves and the like and the seats therefor may be effectively ground and relieved of any gummy substances or other foreign matter accumulated thereon.

In the present instance, I have shown the end 2 of the shank 1 as pointed. It is to be understood, however, that the valve engaging end of the shank may be formed in any suitable or preferred manner and furthermore, the shank 1 may be made in two sections so that the valve engaging end thereof may be changed to accommodate various styles of valves, as will be readily understood to those skilled in the art.

I claim:

1. A valve grinder comprising a shank having a valve engaging end, an actuating shaft, a universal joint between the free end of the said shank and the adjacent end of said shaft, a pinion on said shaft, a segmental rack connected to said shank and meshing with said pinion, a grip loosely encircling said actuating shaft whereby the pinion may be moved from the rack to rotate the shank, and a handle connected to said rack and offset therefrom.

2. A valve grinder comprising a shank having a valve engaging end, an actuating shaft, a universal joint between the free end of said shank and the adjacent end of said shaft, a pinion on said shaft, a frame composed of a tubular sleeve loose on said shank and arms diverging from said sleeve, a rack connected to the free ends of the arms and meshing with said pinion, a grip loosely encircling said actuating shaft whereby the pinion may be moved from the rack to oscillate said shank, and a handle connected to the rack and offset therefrom.

3. A valve grinder comprising a shank having a valve engaging end, an actuating shaft for the shank, a universal joint between the free end of the shank and the adjacent end of said shaft, means for moving the actuating shaft from side to side, and means for rotating said actuating shaft in its movement whereby an oscillatory movement may be imparted to said shank.

In testimony whereof I affix my signature in presence of two witnesses.

SAMUEL S. LIVEZEY.

Witnesses:
ABEL COMSTOCK,
WARREN PARKER.